United States Patent [19]

Frick

[11] 4,197,739
[45] Apr. 15, 1980

[54] SPLIT BAR VORTEX SHEDDING FLOWMETER

[75] Inventor: Roger L. Frick, Eden Prairie, Minn.

[73] Assignee: Rosemount Inc., Eden Prairie, Minn.

[21] Appl. No.: 917,919

[22] Filed: Jun. 22, 1978

[51] Int. Cl.² ............................................. G01F 1/32
[52] U.S. Cl. ................................................ 73/194 VS
[58] Field of Search .................................. 73/194 VS

[56] References Cited

U.S. PATENT DOCUMENTS

| 3,116,639 | 1/1964 | Bird | 73/194 |
| 3,572,117 | 3/1971 | Rodley | 73/194 |
| 3,972,232 | 8/1976 | Miller et al. | 73/194 |
| 3,979,954 | 9/1976 | Ide et al. | 73/194 |
| 3,996,796 | 12/1976 | Adler | 73/194 |
| 4,030,355 | 6/1977 | Herzl | 73/194 |
| 4,069,708 | 1/1978 | Fussell, Jr. | 73/194 |

FOREIGN PATENT DOCUMENTS

| 48-20553 | 3/1973 | Japan | 73/194 |
| 50-9015 | 3/1975 | Japan | 73/194 |
| 52-132866 | 11/1977 | Japan | |
| 823684 | 11/1959 | United Kingdom | 73/194 |
| 1502260 | 3/1978 | United Kingdom | |

OTHER PUBLICATIONS

Roshito, "The Drag and Shedding Frequency of Two Dimensional Bluff Bodies", Technical Note 3169, 7/54 NACA Publication.
Hoerner, "Fluid-Dynamic Drag", 1965.

*Primary Examiner*—Herbert Goldstein
*Attorney, Agent, or Firm*—Kinney, Lange, Braddock, Westman & Fairbairn

[57] ABSTRACT

A vortex shedding flowmeter assembly which utilizes at least one vibrating body that is positioned in relation to an upstream facing vortex forming plate so that vibration of the body caused by vortices formed at the edges of the plate is enhanced. The body is separated from the plate so it will vibrate without causing vibration of the plate. The vibration body may be split transversely generally in the midsection of the body so that the body forms two cantilevered portions.

10 Claims, 3 Drawing Figures

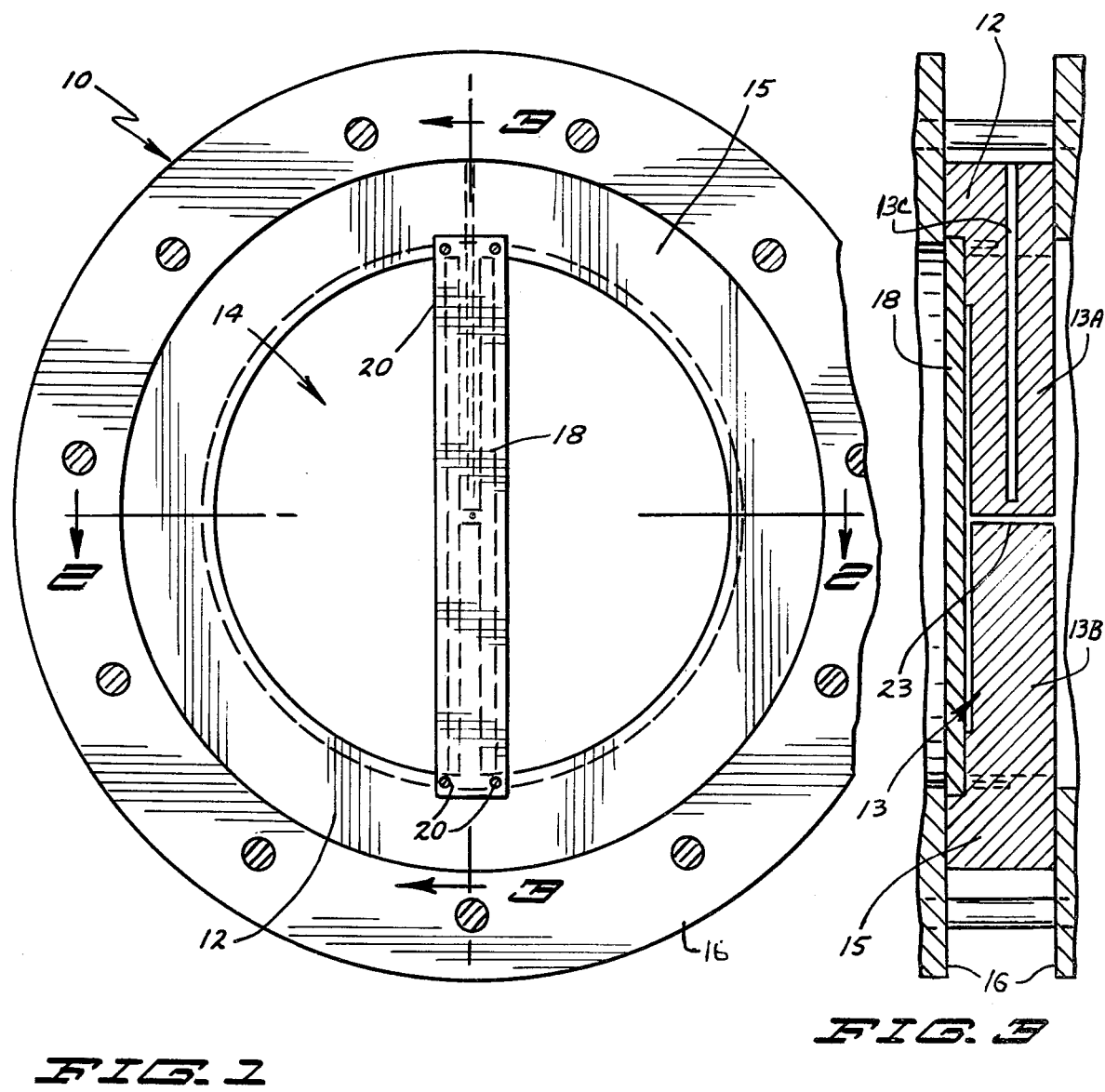

SPLIT BAR VORTEX SHEDDING FLOWMETER

BACKGROUND OF THE INVENTION

1. Field of the Invention

The present invention relates to vortex shedding flowmeters.

2. Prior Art

In the prior art various vortex shedding flowmeters have been advanced. For example, U.S. Pat. No. 3,972,232 shows a vortex shedding flowmeter that has a vibrating body or bar which is separated from the rear surfaces of a forward plate. The body or bar and the plate form a generally T shaped cross section.

U.S. Pat. No. 3,116,639 teaches the use of the body which causes formation of vortices, and a second body spaced downstream which is a vibrating body and the vibrations of which are affected by the vortices. The vibration of the downstream body is sensed to determine the rate of flow through the flowmeter.

Japanese Patent Disclosure 20553/1973 shows a vortex sensor in FIG. 7 that includes an upstream body separated from the vibrating body.

U.S. Pat. No. 3,572,117, shows a vortex shedding flowmeter as well.

SUMMARY OF THE INVENTION

The present invention relates to a vortex shedding flowmeter which utilizes at least one vibrating bar extending transversely of the fluid flow stream. A plate of larger lateral width than the vibrating bar is positioned immediately upstream from the vibrating bar and is not attached to the bar. The bar vibrates as vortices formed by the upstream plate flow past the bar.

The vibrating bar may be reduced in rigidity in direction transverse to the flow and thus is more sensitive to vortices formed from the upstream plate. The upstream plate in turn can be relatively wide in lateral or transverse width to form large (strong) vortices that flow past the vibrating bar. The vortex influenced deflections of the vibrating bar are sensed in a desired manner to determine the rate of flow.

The device is manufactured in a manner so that the vortex forming plate is attached to the flowmeter supports, after the vibrating bar has been formed from a wafer of suitable material.

The vibrating bar may be split transversely so that it is in two sections, each of which cantilevers from its respective supported end.

BRIEF DESCRIPTION OF THE DRAWINGS

FIG. 1 is an elevational view of a typical vortex shedding flowmeter made according to the present invention viewed from upstream direction;

FIG. 2 is a sectional view taken as on line 2—2 in FIG. 1; and

FIG. 3 is a sectional view taken as on line 3—3 in FIG. 1.

DESCRIPTION OF THE PREFERRED EMBODIMENTS

Referring to the drawings and the numerals of reference thereon, a vortex flowmeter indicated generally at 10 is mounted in a suitable conduit in which flow indicated by arrow 11 is passing. The flowmeter comprises a generally flat wafer or plate 12 of suitable material, which is milled out to form a narrow bar 13 that is supported at its opposite ends on the inner periphery of the rim 15 which is left after milling out the flow opening indicated generally at 14. The bar 13 extends diametrically across the flow opening. The rim 15 can be mounted in a manner similar to an orifice plate between two pipe flanges 16,16 for the flow conduit and as shown the plane of the rim is generally perpendicular to the flow direction.

The vibrating bar 13 will vibrate from side to side, upon the generation of vortices indicated generally at 17, that are generated along the sides of a vortex forming plate 18. The plate 18 is narrow (or thin) in the direction of flow, and extends laterally to a width approximately one-fourth of the diameter of the effective flow opening 14 defined in the wafer or plate 12.

The edge surfaces of the plate 18 extending parallel to the flow are beveled to form a generally trapezoidal shape so that sharp edges 18A are formed at the lateral sides on the upstream or flow facing surface of the plate 18. The angled sides taper toward each other in the direction of flow.

The plate 18 is fastened onto the support rim 15 with suitable screws indicated at 20 at the top and bottom. The plate 18 is not fastened to the vibrating bar 13 between its mountings or supports. A space between the adjacent surfaces of the plate 18 and the bar 13 in the range of 0.010 is provided.

The plate 18 thus is trapezoidal in cross section a shown in FIG. 2. The beveled edges tend to aid in formation of vortices. The vortices that flow past the vibrating bar 13 cause the bar 13 to vibrate side to side and this motion is sensed in a known manner by a sensor mounted in the elongated opening 13C shown in the drawings.

Further, the bar 13 can be split into two sections with a slit 23 that forms the bar 12 into sections 13A and 13B, each of which is mounted to the peripheral ring or rim 15. The sections 13A and 13B cantilever toward the center of the flow opening. This slit 23 can be relatively narrow so there isn't any substantial flow through the slit. The bar portions 13A and 13B will tend to vibrate more at low flows than a continuous diametral bar supported at both ends.

The assembly of the plate and bar, as shown, gives high signal to noise ratio in that the vibrating member 13 is made quite thin transverse to flow direction, and the vortex forming plate or member 18 can be substantial width in direction transverse to flow to form strong vortices.

With the gap between the member 18 and the member 13 filled with a pliable, resilient material such as elastomeric material, rubber or the like, vibrating bar 13 will still be able to vibrate and flow across the upstream face of the bar 13 will be prevented. Filling the gap with such a known material precludes foreign material from entering and remaining in the gap which may change the vibration characteristics of the member 13.

Also, the slit 23 does not have to be in the center of the bar but can be adjacent the rim 15 if desired.

What is claimed is:

1. A vortex generating flowmeter including a vibrating bar having a longitudinal axis adapted to be supported relative to a flow conduit having a wall, support means separate from the flow conduit wall fixedly supporting the vibrating bar adjacent at least one end thereof and with the vibrating bar extending substantially across a conduit in which the vibrating bar is placed to be subjected to flow through the conduit, said vibrating bar having a width transverse to the direction of flow in which it is placed substantially less than its length parallel to the direction of flow, and a vortex generating plate mounted on the same support means as said vibrating bar immediately upstream from and closely spaced from said vibrating bar, said plate being centered with respect to said vibrating bar in direction generally transverse to the direction of flow and said plate being substantially wider than the vibrating bar in direction of the width of said vibrating bar, and said plate being substantially thinner in direction parallel to the direction of flow than in transverse width, said plate being fixedly supported at both of its ends relative to the vibrating bar at locations adjacent the opposite ends of the vibrating bar only whereby the vibrating bar may vibrate between its ends relative to the plate.

2. The combination specified in claim 1 wherein said vibrating bar includes means to support a sensor to sense vibration of said vibrating bar caused by vortices generated by said plate.

3. The combination as specified in claim 1 wherein said plate is removably attached with respect to said support means and said vibrating bar.

4. The combination of claim 1 wherein said plate is generally trapezoidal in cross section and the flow facing surface thereof has a greater transverse width than the oppositely facing surface thereof.

5. The flowmeter of claim 1 wherein said means mounting said plate spaces the plate from the upstream end of said body a distance substantially in the range of 0.010 inches.

6. A vortex generating flowmeter including a body supported relative to a flow conduit and extending into said conduit to be subjected to the flow therethrough, said body having a width transverse to the direction of flow substantially less than its length parallel to the direction of flow, and a vortex generating plate immediately upstream from and spaced from said body, said plate being centered with respect to said body in direction generally transverse to the direction of flow and said plate being substantially wider in direction of the width of said body than the transverse width of said body, and said plate being substantially shorter in direction parallel to the direction of flow than in transverse width, said body extending across the conduit, support means for said body supporting said body at opposite ends thereof, said plate being removably attached with respect to said support means in position adjacent said body, and said body being slit transversely at location between its opposite ends.

7. A vortex flowmeter assembly comprising a support including an annular rim member defining a plane, said rim member defining a central interior opening through which fluid may flow in direction perpendicular to said plane of said rim, a flow obstruction body assembly mounted on said rim and including a first body extending substantially diametrally across said opening and being supported with respect to said rim, said first body having a width measured parallel to the plane of said rim substantially less than the length of said body perpendicular to said plane, said body assembly further including a plate member supported on said rim upstream of said body and in closely spaced relationship to the upstream edge of the body, said plate member extending substantially across said opening and being supported with respect to said rim adjacent its opposite ends and being otherwise unattached with respect to said body, said plate having a width in direction parallel to said plane substantially greater than the width of said body, and said plate width being substantially centered on said body, and said plate having a dimension in direction parallel to the flow direction substantially less than its width.

8. The combination as specified in claim 7 wherein said plate is removably attached to said rim at the opposite ends of said plate.

9. The combination as specified in claims 7 or 8 wherein said body is separated into two body portions by a transverse slit substantially midway between the ends of said body.

10. The combination of claim 7 wherein said plate has a cross section viewed substantially perpendicular to its length which is generally trapezoidal, and the sides of said plate extending in direction of fluid flow taper together in direction of fluid flow through said flowmeter.

* * * * *